(12) United States Patent
Lacaze et al.

(10) Patent No.: US 11,170,106 B2
(45) Date of Patent: Nov. 9, 2021

(54) SYSTEM FOR DETECTING HARDWARE TROJANS IN INTEGRATED CIRCUITS

(71) Applicant: Robotic Research, LLC, Clarksburg, MD (US)

(72) Inventors: Alberto Lacaze, Gaithersburg, MD (US); Karl Murphy, Gaithersburg, MD (US)

(73) Assignee: Robotic Research, LLC, Clarksburg, MD (US)

( * ) Notice: Subject to any disclaimer, the term of this patent is extended or adjusted under 35 U.S.C. 154(b) by 0 days.

(21) Appl. No.: 15/976,538

(22) Filed: May 10, 2018

(65) Prior Publication Data
US 2019/0347416 A1 Nov. 14, 2019

(51) Int. Cl.
*G06F 21/56* (2013.01)
*G01R 31/28* (2006.01)
*G01R 31/00* (2006.01)

(52) U.S. Cl.
CPC ......... *G06F 21/567* (2013.01); *G01R 31/002* (2013.01); *G01R 31/2884* (2013.01); *G06F 2221/033* (2013.01)

(58) Field of Classification Search
CPC .. G06F 21/567; G06F 21/56; G06F 2221/033; G06F 21/72; G06F 21/75; G06F 21/755; G06F 21/76; G01R 31/002; G01R 31/2884; H04L 9/002; H04L 9/003
See application file for complete search history.

(56) References Cited

U.S. PATENT DOCUMENTS

| | | | | |
|---|---|---|---|---|
| 6,161,183 A | * | 12/2000 | Saito | G06F 21/10 380/282 |
| 8,850,608 B2 | * | 9/2014 | Tehranipoor | H03K 3/0315 380/44 |
| 9,606,167 B2 | * | 3/2017 | Kung | G01R 31/2601 |
| 2002/0163380 A1 | * | 11/2002 | Hughes | G06J 1/00 327/552 |

(Continued)

FOREIGN PATENT DOCUMENTS

| | | |
|---|---|---|
| CN | 102636743 A | 8/2012 |
| CN | 102654560 A | 9/2012 |

(Continued)

OTHER PUBLICATIONS

English language Abstract of CN102636743.
(Continued)

*Primary Examiner* — Malcolm Cribbs
(74) *Attorney, Agent, or Firm* — RowanTree Law Group, PLLC; Carson C. K. Fincham

(57) ABSTRACT

The system for detecting hardware trojans in integrated circuits by analyzing the substrate noise generated by the unique physical properties of such an integrated circuit disclosed herein may compare the substrate noise signatures of a subject IC against the noise signature from one or more known good ICs to detect such trojans, and may measure the electromagnetic, current, or voltage noise of an IC as a function of time synchronized with the test sequence. The system may allow for the testing of such substrate noise at multiple points around the IC, and may further comprise a Cypher Block Chain (CBC) technique to incorporate the noise measurements over time into a signature unique to the IC.

4 Claims, 5 Drawing Sheets

(56) References Cited

U.S. PATENT DOCUMENTS

| | | | | |
|---|---|---|---|---|
| 2005/0110671 | A1* | 5/2005 | Lee | H03L 7/0805 |
| | | | | 341/162 |
| 2010/0102853 | A1* | 4/2010 | Hollis | G11C 7/02 |
| | | | | 326/86 |
| 2012/0249164 | A1* | 10/2012 | Summers | G01N 22/00 |
| | | | | 324/637 |
| 2013/0019324 | A1* | 1/2013 | Tehranipoor | H03K 3/0315 |
| | | | | 726/34 |
| 2017/0161485 | A1* | 6/2017 | Aguayo Gonzalez | G06F 21/76 |
| 2017/0310688 | A1* | 10/2017 | Lecomte | H04L 63/1425 |
| 2018/0004944 | A1* | 1/2018 | Nagata | G06F 11/22 |
| 2018/0139055 | A1* | 5/2018 | Brathwaite | H04L 9/3247 |

FOREIGN PATENT DOCUMENTS

| | | |
|---|---|---|
| CN | 102854454 B | 7/2014 |
| CN | 104237768 A | 12/2014 |
| CN | 104316861 A | 1/2015 |
| CN | 104330721 A | 2/2015 |
| CN | 103488941 | 9/2016 |
| CN | 103488941 B | 9/2016 |
| CN | 103698687 B | 1/2017 |
| CN | 104239616 B | 3/2017 |
| CN | 105116317 B | 12/2017 |
| EP | 3201821 A1 | 8/2017 |
| EP | 3246717 A1 | 11/2017 |
| WO | 2012122309 A2 | 9/2012 |
| WO | WO2012122309 A2 | 9/2012 |

OTHER PUBLICATIONS

English language Abstract of CN102654560.
English language Abstract of CN104237768.
English language Abstract of CN104316861.
English language Abstract of CN104330721.

\* cited by examiner

SYSTEM FOR DETECTING HARDWARE TROJANS IN INTEGRATED CIRCUITS

PRIORITY NOTICE

The present application is a non-provisional application and makes no claims of priority under 35 U.S.C. § 119(e) to any U.S. Provisional Patent Applications.

TECHNICAL FIELD OF THE INVENTION

The present invention relates in general to digital security, and, more specifically, to a system for detecting hardware trojans in integrated circuits by analyzing the substrate noise generated by the unique physical properties of such an integrated circuit.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

A hardware trojan is a known type of malicious modification of the circuitry of an integrated circuit (IC). With modern tools, it is relatively simple even for a less-sophisticated adversary to introduce hardware trojans into such integrated circuits. To some degree, modern Application-Specific Integrated Circuit (ASIC) modular design approaches to IC development have further simplified these exploits by creating known optimized modules that are easy to identify under a microscope, reproduce, and inject with a trojan. For more sophisticated adversaries, even obfuscation of the IC does not provide a good barrier, as the techniques for scanning and copying designs with multiple layers and materials has been reduced to an automated science.

Even software and hardware detection methods have failed in the past to detect hardware trojans. From the software detection side, the triggering mechanisms for enabling the hardware trojans is usually undetectable to virus scanners or other software-based detection mechanisms (such as timing profilers). From a hardware standpoint, commercial and Department of Defense (DoD) entities have attempted in the past to create obfuscated methods of building "trusted modules" in an effort to track provenance and, therefore, extrapolate integrity. So far, these attempts have failed in very public ways. For example, the Trusted Platform Module (TPM) was cracked within months of it becoming publicly available, with engineers across the globe being able to replicate ICs, get internal signals, and bypass the integrated protections.

Although the concentration of this topic is different from the goal of the TPM, the TPM fiasco, and the massive amounts of private and government funds spent on its development, casts a shadow in this field of research that cannot be easily ignored.

It is known to have an integrated circuit trojan detection method that involves the cutting and grinding of layers from the IC, and then performing visual inspections to find the hardware trojan. Such visual inspection methods may include scanning optical microscopy, scanning electron microscopy, pico-second imaging circuit analysis, voltage contrast imaging, light-induced voltage alteration, and charge-induced voltage alteration. In such methods the IC must be compared with a known unaltered IC, though such a comparison is both difficult to perform and carries a high risk of failure.

It is known to have an integrated circuit trojan detection method that involves adding circuitry to an IC that may help to verify that the IC, as built, is free from trojan hardware. Such a method may comprise a Built-In Self-Test (BIST) or Design For Testing (DFT) mechanism, and may also be used to check the IC for manufacturing defects that could cause adverse functioning. Such methods install extra logic monitors within the IC that may be analyzed, either internally or externally, for the presence of hardware not expected within the IC as designed. Such methods may also be used to check isolated areas of the IC for trojan hardware, and carry a high rate of reliability.

It is known to have an integrated trojan detection method that involves measuring and analyzing the power consumption of an IC against the expected power draw of a known good IC. Such a method may be known as Side Channel Detection, and presumes that a hardware trojan will draw power from the system. Such a method, though, requires that the hardware trojan be activated at the time that the measurement is taken, as a deactivated trojan may not consume power, and carries a risk of failure in detecting trojans that are not yet activated.

There is a need in the art for a system to detect hardware trojans by measuring the substrate noise generated within an IC. Such a system may compare the substrate noise signatures of a subject IC against the noise signature from one or more known good ICs to detect such trojans, and may measure the electromagnetic, current, or voltage noise of an IC as a function of time synchronized with the test sequence. The system may allow for the testing of such substrate noise at multiple points around the IC, and may further comprise a Cypher Block Chain (CBC) technique to incorporate the noise measurements over time into a signature unique to the IC.

It is to these ends that the present invention has been developed.

BRIEF SUMMARY OF THE INVENTION

To minimize the limitations in the prior art, and to minimize other limitations that will be apparent upon reading and understanding the present specification, the present invention describes a system for detecting trojans in integrated circuits by analyzing the substrate noise generated by the unique physical properties of such an integrated circuit.

It is an objective of the present invention to provide a system for detecting trojans that may compare the noise signatures of a subject IC against the noise signature from one or more known good ICs.

It is another objective of the present invention to provide a system for detecting trojans that may measure the electromagnetic, current, or voltage noise of an IC as a function of time synchronized with the test sequence.

It is another objective of the present invention to provide a system for detecting trojans that may measure the noise signatures of an IC at multiple test points within the IC.

It is another objective of the present invention to provide a system for detecting trojans that comprises an integrator to collect the noise measurements from within the IC at various intervals.

It is another objective of the present invention to provide a system for detecting trojans that comprises a Cypher Block Chain (CBC) technique to incorporate the noise measurements over time into a signature unique to the IC.

It is another objective of the present invention to provide a system for detecting trojans that comprises a plurality of test nodes incorporated as a part of the IC, whether internally or externally, for facilitating noise measurements of noise from within the IC.

It is another objective of the present invention to provide a system for detecting trojans that comprises test nodes which may be turned on or off, as needed, by a user's command.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Figure 1:
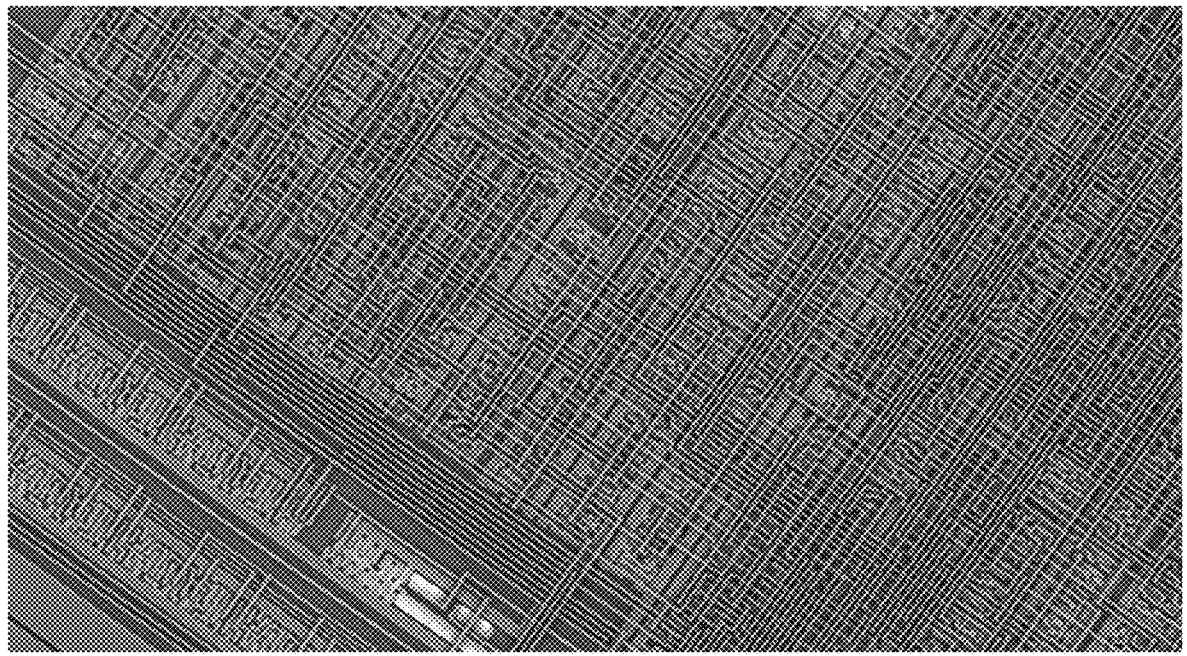
FIG. 1 illustrates an exemplary modern Graphics Processing Unit (GPU) under microscopic enhancement.

Certain terminology is used in the following description for reference only and is not limiting. Unless specifically set forth herein, the terms "a," "an," and "the" are not limited to one element, but instead should be read as meaning "at least one."

The present invention relates generally to digital security, and, more specifically, to a system for detecting hardware trojans in integrated circuits by analyzing the substrate noise generated by the unique physical properties of such an integrated circuit. As contemplated by the present disclosure, substrate noise refers to the property of various signals within an integrated circuit (IC) to couple from one node to another across the IC substrate. The characteristics of such noise are heavily influenced by the location and proximity of various physical characteristics of an IC, and are unique to particular IC form factors.

Central to the present invention, the system uses IC substrate noise as a pseudo random number generator to feed a Cypher Block Chain (CBC) circuit, which then creates a unique signature that may be used to compare a suspect IC against a trusted one. When running a known test program on the suspect IC, the substrate noise reliably repeats the resulting CBC output if the physical properties of the two ICs are identical. On the other hand, if any of the physical properties of the IC are modified (for example, by adding, modifying, or removing circuits) the substrate noise creates a significantly different input to the CBC and a different output will be generated. This substrate noise, being unique to each IC design, so encompasses the physical properties of the module being protected that it is virtually impossible to replicate where an additional entity, such as a hardware trojan, is present.

One obvious advantage of the present system is that there are no vulnerabilities that may be copied by a malicious user. In other words, each test program run on an IC creates unique time dependent noise, and therefore, a unique output signature. Further, since the malicious user does not know which of the infinite number of combinations of test programs will be used, that user will be unable to predict the CBC response. As an example, if the IC in question is a Central Processing Unit (CPU), a first movie could be played as a test sequence, and this playing of the first movie will generate a specific CBC key response. If a second movie is played instead, the CBC will generate an entirely different key response. Both keys would be repeatable in the unadulterated ICs, but each will be different when compared to a modified IC. Since the malicious user does not know which test movie may be played, they will not be able to create countermeasures to make the substrate match all responses of the unadulterated system.

The present system may also be integrated into modern IC design protocols intending to minimize substrate noise. This method may allow for integration of the appropriate circuitry at the gate level and, therefore, may simplify the method of implementation by merely re-defining the primitive IC components. Some implementations of the present system do not increase the footprint of the relevant ICs, which may provide significant advantages in library compatibility.

Substrate noise especially affects mixed mode circuits, which are ICs comprising both digital and analog components. Since more ICs are developed as System On Chip (SOC) modules, it is useful to integrate digital circuitry for performing the traditional functions of the CPU and memory in conjunction with analog circuitry to provide interfaces, radio cores, and wireless functionality, which reduces costs and minimizes required board sizes. This advancement has created significant noise problems, though, as RF aggressive (usually digital) gates create noise that interferes with victim (usually analog) parts of the system. Although the present system does not require that the IC be mixed mode, the study of substrate noise is heavily focused on such SOCs as these circuits have the greatest need to minimize substrate noise in order to reduce the interference acting on analog components.

There exist four primary sources of substrate noise as a result of coupling between the multiple elements of an IC: crosstalk across metal wires, substrate noise coupling, power line noise coupling, and radiation noise coupling.

Crosstalk across metal wires happens because most metal lines are placed parallel to each other, thus creating good capacitors. The closer together and longer the lines are, the more crosstalk exists. Most known automated routing tools create straight parallel lines to connect the circuits as part of their programming, a design function performed automatically by Application-Specific Integrated Circuit (ASIC) design software.

FIG. 1 illustrates an exemplary modern Graphics Processing Unit (GPU) under microscopic enhancement. It is possible to see that the alignment of the metal wires follows a strong east-west or north-south alignment, and each of the wires placed creates a capacitor that affects the substrate. Because the circuits do not fire randomly, but instead fire at the pace of the CPU's internal clock, the electrical fields, currents, and voltages generated in the substrate also follow a unique timing. As expected, the substrate noise generated depends not only on which wires carry current but also when such current is carried. The noise is not only local to the wire, but is affected by the fields generated by every wire in proximity. Due to the large relative length of these wires, their crosstalk can be sensed in the substrate throughout the IC, and adding a trojan that modifies the system will have a significant effect on the generated fields across the IC. It would be nearly impossible to create a trojan that does not affect this field as its wires alone will affect the field in some direction, thus rendering a different signature.

Figure 2:
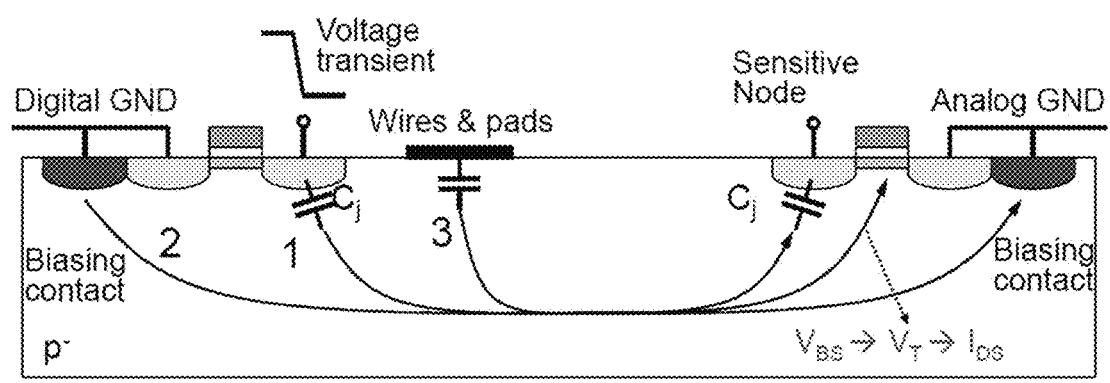
FIG. 2 illustrates a plurality of exemplary substrate coupling pathways.

In Complementary Metal-Oxide-Semiconductor (CMOS) this substrate noise coupling takes many forms. The main culprits are noise injection through reverse-biased capacitance, noise injection through contacts, noise injection through wire-to-substrate capacitance, forward-biased junctions, and hot carriers. FIG. 2 illustrates a plurality of exemplary substrate coupling pathways. Each of these effects changes depending if the IC uses a p− or p+ substrate and if the digital and analog grounds are embedded into n-wells. There are extensive papers written about this effect for SOC (see generally Pietro Andreani and Raj Parijar).

It is important to note that FIG. 2 shows coupling occurring between the analog and digital circuits, but substrate noise coupling also exists between GNDs and $V_{DS}$ of different submodules within the circuit. Crosstalk creates voltages and currents that are not running in the east-west or north-south alignment like the metal wire coupling, but instead creates couplings between the transistors themselves as they are being powered and switched. This is an important feature as it creates yet another signature that can be measured across the substrate, which is also affected in the event that trojan circuitry is present.

Not only do the wires in the surface of the IC create crosstalk, but so do the wires that connect the surface of the IC to the external packaging. Packaging fabrication has an effect on how these wires are run and therefore how they affect the substrate. Some areas of the chip are more affected than others, but, overall, these wires carry significant current that affects the substrate.

Figure 3:
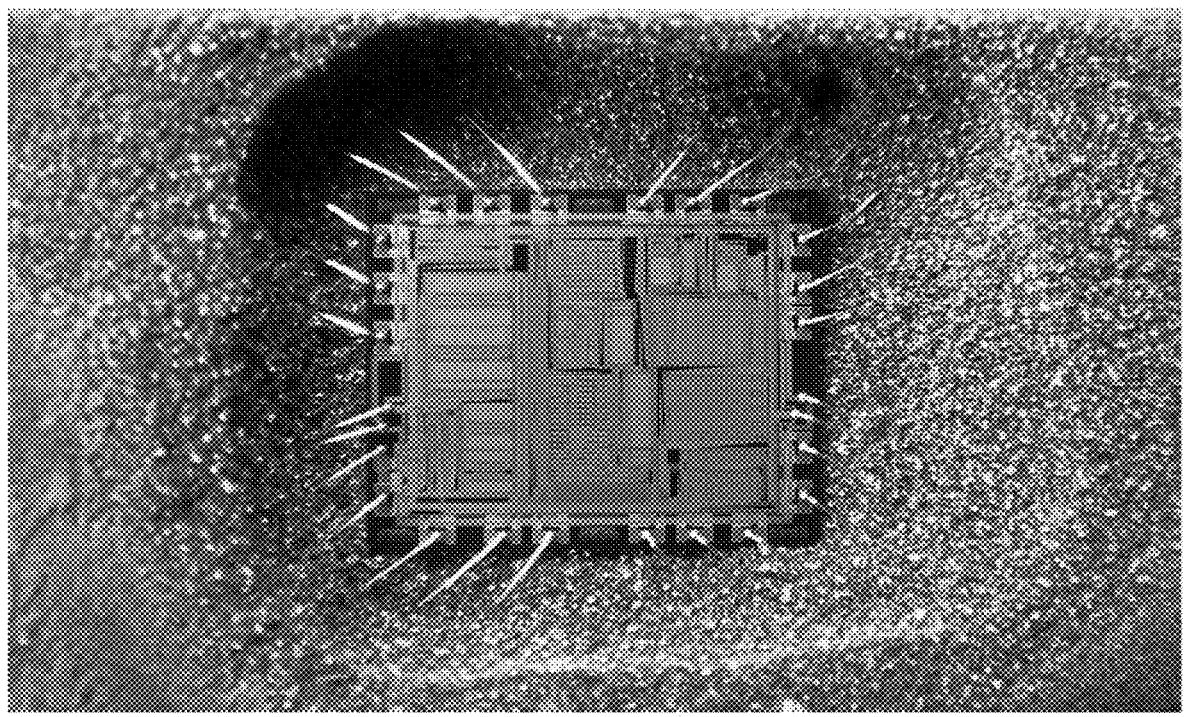
FIG. 3 illustrates an exemplary installation of analog components that may create measurable noise within an IC.

FIG. 3 illustrates an exemplary installation of analog components that may create measurable noise within an IC. The power supply lines create inductance with the bonding wires, and, therefore, transmit to the substrate at the pace of the CPU's internal clock as power is distributed to the circuits. Other analog elements can also create noise, including RF inductors, chip to chip connectors, or test pads.

Modern circuits running at high clock rates emit radiation across a large frequency spectrum. The wires and pads act as antennas, and receivers transmit electromagnetic (EM) waves across the substrate. This radiation follows different pathways than capacitive crosstalk, but is similarly affected by the material that lays between the emitter and the receiver, and, therefore, is similarly affected by having a trojan placed in between the two. Such radiation is yet another component of the noise in the substrate that is hard to predict, and creates unique interactions that are beyond the capabilities of current systems to predict and reverse engineer.

Although most ASIC design packages provide some rudimentary capacitive coupling simulators and some specialized packages can model some of the radiation effects, these effects are only computed as a steady state averaged value rather than a time domain modeling of the signals. Thus, reverse engineering is not a simple task. Even if these capabilities would be available, because a malicious user would lack the knowledge of the test program to be used, they would be incapable of reverse engineering the substrate noises at each point in the substrate.

In a system where substrate noise can be detected at multiple points around the IC, if a malicious user tries to add a trojan to the same IC to have the substrate noise at each point be identical, after the trojans are added, would be almost impossible as the interactions with the complex electrical and electromagnetic couplings of the circuit will affect one measured point after another. The malicious user would have to create the same response in the sensed locations regardless of the program being executed in the IC, further complicating their task. It is clear that such alterations are beyond the capabilities of current and foreseeable simulations and manufacturing capabilities.

Figure 4:
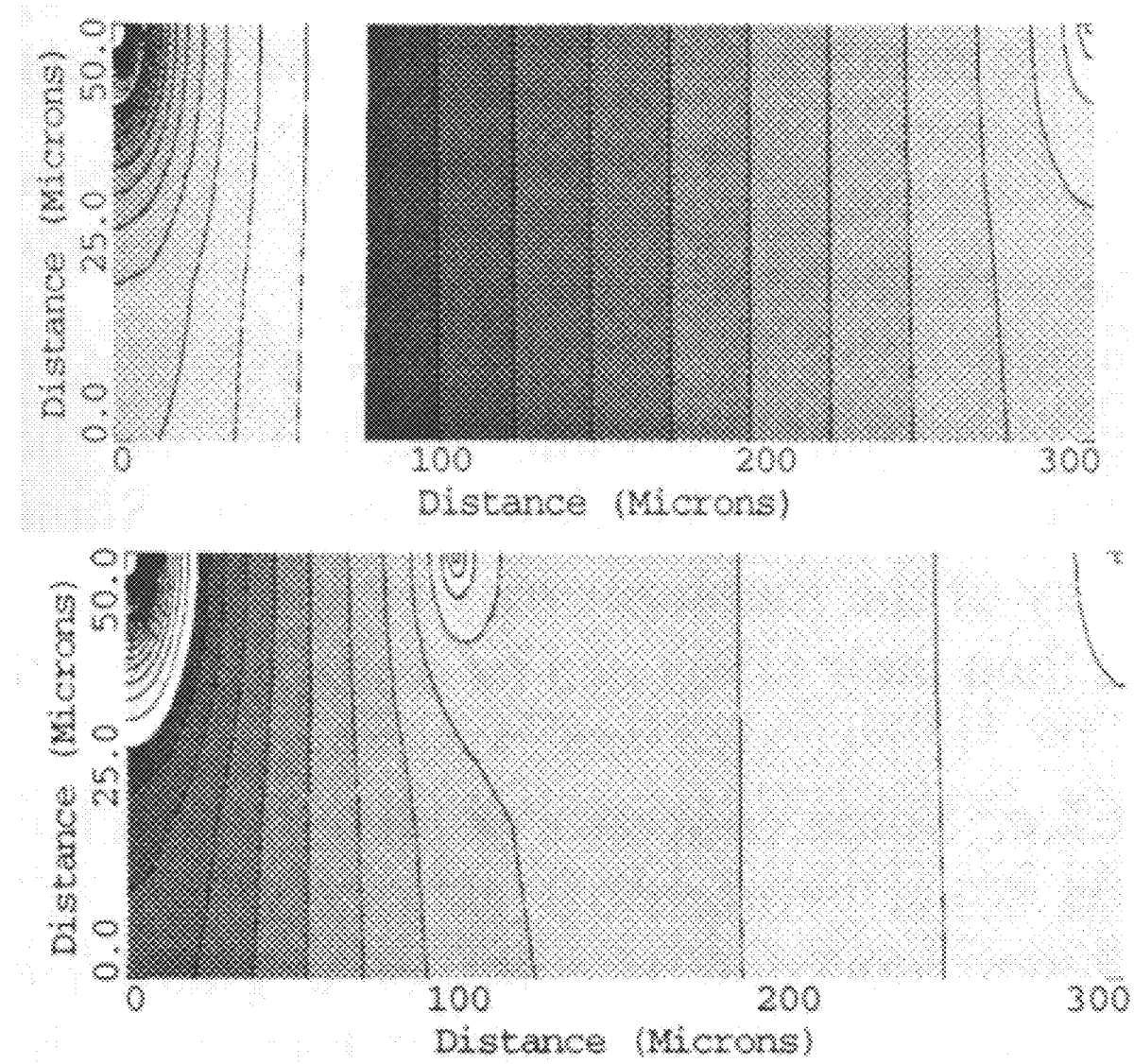
FIG. 4 illustrates a visual representation of substrate noise level in a non-trojan circuit versus substrate noise level when a single guard ring is added.

FIG. 4 illustrates a visual representation of substrate noise level in a non-trojan circuit versus substrate noise level when a single guard ring is added. Notably, the figure shows two noise profiles of a simple Andreoni circuit. On the left is an unadulterated circuit, while on the right is the same circuit after a single ring (or wire) was added. The figure shows how the noise is severely affected even when the wire is placed 300 microns apart. Thus, a trojan circuit, even with relatively small circuitry, would have a significant effect on the substrate noise.

As noted above, a number of manufacturing methods have been employed to reduce substrate noise in modern ICs. Some of the known methods include using oxide trenches, n-doped rings to $V_{DD}$, n-doped rings with wells to $V_{DD}$, n-doped rings to ground, p-doped rings to ground, and buried ground layers.

As can be expected, the buried ground layers are more effective, but significantly costlier to produce. Many IC manufacturers have rushed to patent some of these techniques, and use them to pack even more circuits into the same IC board area. Even though these noise isolation methods are different, and the manufacturing techniques are different, they all effectively perform the same function: they funnel the electrical energy that would have normally coupled between the parts of the circuit into a "highway" out of the substrate. Said another way, they decouple the impedance of the return path of the substrate, thus providing a very low impedance pathway to outside of the IC.

The present system highjacks these noise reduction techniques to provide the substrate measurement circuits that would feed the CBC here. In other words, modern noise isolation techniques currently used provide a framework for the current invention since modern mixed mode ICs already include these rings as part of the building blocks of the IC to channel the noise that is to be measured. The system interfaces with these rings at different stages to measure the noise throughout the IC, thus creating the unique signature for a given IC. If the rings are not present in a particular IC, a similar technique of modifying the elementary block of the ASIC design software to add the measuring devices may be implemented.

Figure 5:
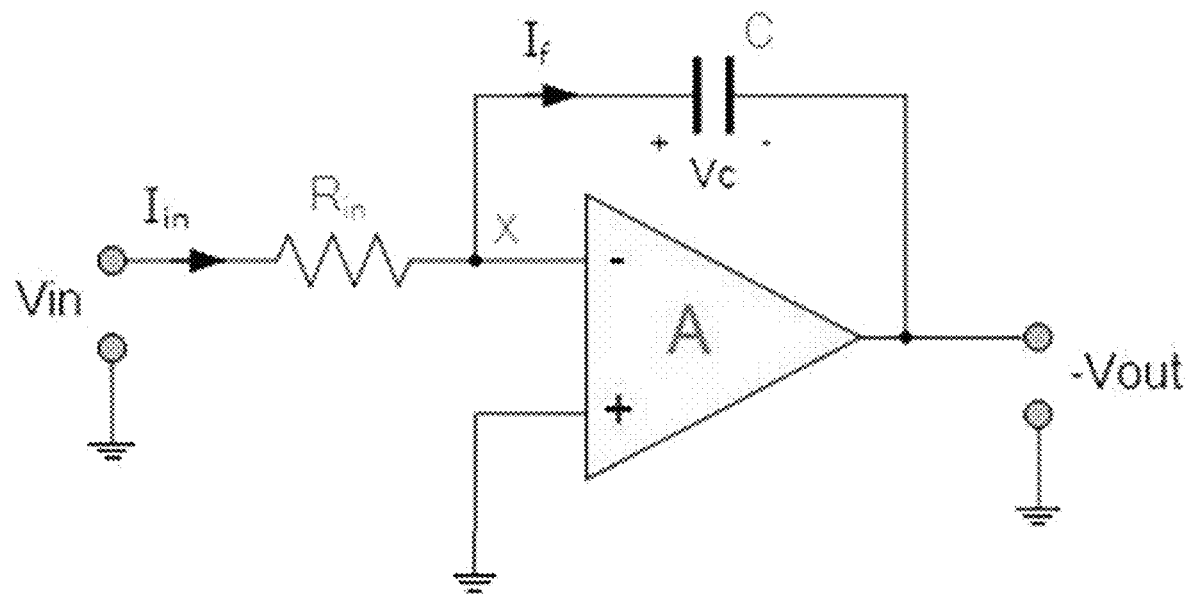
FIG. 5 illustrates a simple integrator circuit used for facilitating noise measurements at a test node within the IC.

FIG. 5 illustrates a simple integrator circuit used for facilitating noise measurements at a test node within the IC. As noted above, the generated substrate noise is transient, and must be treated as such when used as the pseudo number generator. If infinitely short measurements are used, clock errors and manufacturing differences may create differences in the noise measurements. Therefore, a voltage integrator circuit may be used to integrate the voltage over a predefined time at each test node in the substrate. This integration time can be set smaller than a clock cycle, but the present system also allows for longer integration multiples of the system clock.

Where an integrator is installed within a test node, the result of the integrator function becomes a bit in the key used for the CBC. In an embodiment of the present system, such as that used for a CPU, between 100 and 1000 integrators may be distributed around the IC as a component of the substrate noise signature. In a more compact implementation, a single integrator may instead be multiplexed.

Figure 6:
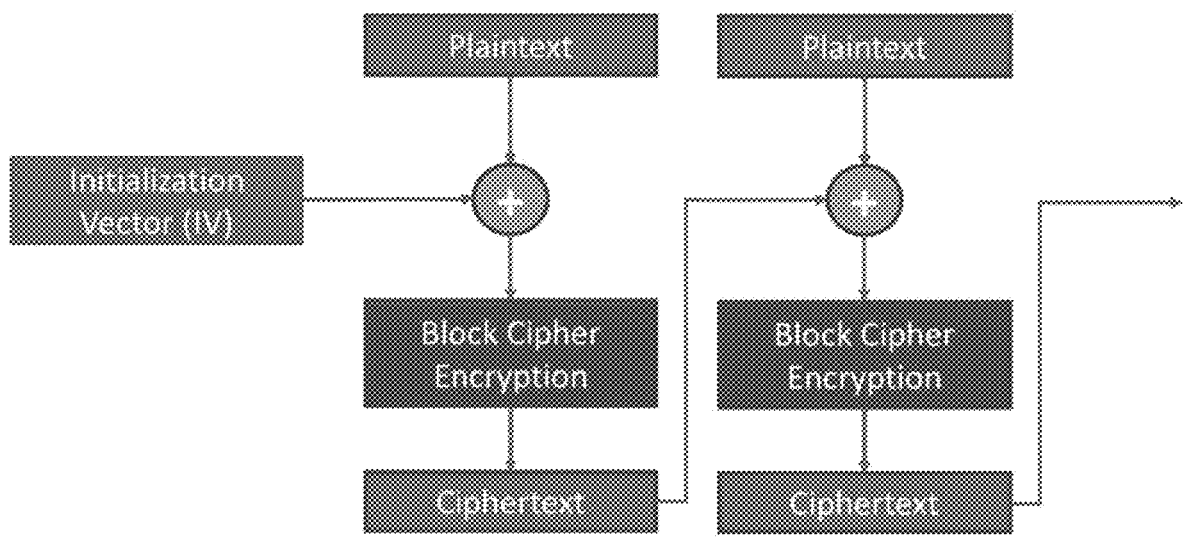
FIG. 6 illustrates a Cypher Block Chain (CBC) flowchart by which prior encryption results may be used to create subsequent cyphertext.

FIG. 6 illustrates a Cypher Block Chain (CBC) flowchart by which prior encryption results may be used to create subsequent cyphertext. CBC is an encryption technique where the results of one cycle are used to encrypt the next cycle. The dependencies created by the sequential use of the encryption make it harder to decrypt. CBC is an integral component of most of the cybercurrencies in use modernly, though the present system uses the CBC for a different purpose. The present system uses the CBC to encode a unique signature from the noises at different times and in the different test points of the substrate. The CBC circuitry could be on chip or outside of the chip, and it is intended that other cryptographic techniques could be used to encode these results also. CBC, though, is simple to implement and is preferred.

Figure 7:
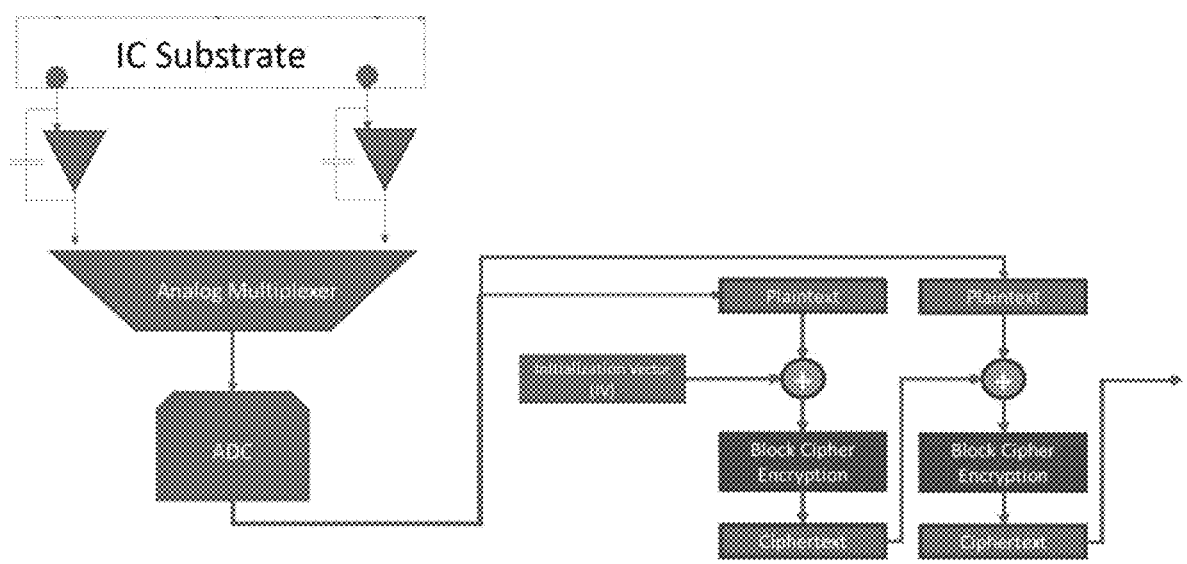
FIG. 7 illustrates a system flowchart by which CBC is used to encrypt sequential substrate noise measurements to create a unique signature that is IC dependent, test program dependent, and initialization vector dependent.

FIG. 7 illustrates a system flowchart by which CBC is used to encrypt sequential substrate noise measurements to create a unique signature that is IC dependent, test program dependent, and initialization vector dependent. The test nodes on the substrate are fed to a bank of analog voltage integrators, and the analog results of these integrations represent the noise of the substrate at a particular geographical location of the substrate. These measurements are multiplexed into an Analog to Digital Converter (ADC) and fed as plain text to the CBC sequences. The resulting cyphertext is a signature that is unique to the IC substrate noise given the software that was being executed at the time of integration. A simplified version of the system replaces the analog ADC with a thresholding circuitry and uses the results of the thresholding of the noise as the bits in the plaintext inputs to the CBC. The CBC can be inside or outside of the IC. The advantage of having it inside is that it reduces the number of pins and bandwidth required to operate the system.

A protocol may be defined for communicating to the IC the starting conditions of the signature generation. Some of these parameters include test software to run on the IC to generate noise, integration time for each integration bank, thresholding levels or analog to digital converter precision, number of CBC cycles, and initialization vectors.

As mentioned earlier none of this information (or any secrets for that matter) are included as part of the IC, therefore significantly thwarting the capabilities of an adversary to create a reverse engineering solution that contains a hardware trojan.

There are several ways that system can be used. The primary method is to compare an IC manufactured by a known source against one that is suspect, where the suspect IC should provide a different cyphertext output given the same initial conditions. A second method for utilizing this system is to have a suspect manufacturing facility create an IC, create signatures using the method shown above, and then destructively inspect the device to make sure that no trojans have been added. Other ICs from then on could be tested for integrity given the test sequences already verified on the one that was destructively tested. In other words, the method can be used to certify ICs by providing a non-destructive test method from an IC that is known to be trojan-free by method or by destructive test.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. A hardware trojan detecting system, comprising:
an integrated circuit;
a measuring circuitry;
a thresholding circuitry;
a cryptographic technique; and
a test software;
wherein said integrated circuit generates a substrate noise as a pseudo random number generator to feed a Cypher Block Chain (CBC), then creates a unique signature that may be used to compare a suspect integrated circuit against a trusted one while running said test software; wherein said substrate noise is measured by said measuring device and output as a unique signature; wherein a thresholding circuit converts said unique signature into a plaintext sequence; and wherein said plaintext sequence is converted by said cryptographic technique to a cyphertext signature.

2. The hardware Trojan detecting system of claim 1, wherein said thresholding circuitry is an analog to digital convertor.

3. The hardware Trojan detecting system of claim 1, wherein said cryptographic technique is a cypher block chain circuit.

4. The hardware Trojan detecting system of claim 1, wherein said integrated circuit is a noise-minimizing circuit; and wherein said measuring circuitry is a noise-reducing component.

* * * * *